March 24, 1970 W. N. LOTZ 3,502,041
COMBINATION DOUGH DEGASSER AND TRANSFER MACHINE
Filed March 22, 1968 2 Sheets-Sheet 2
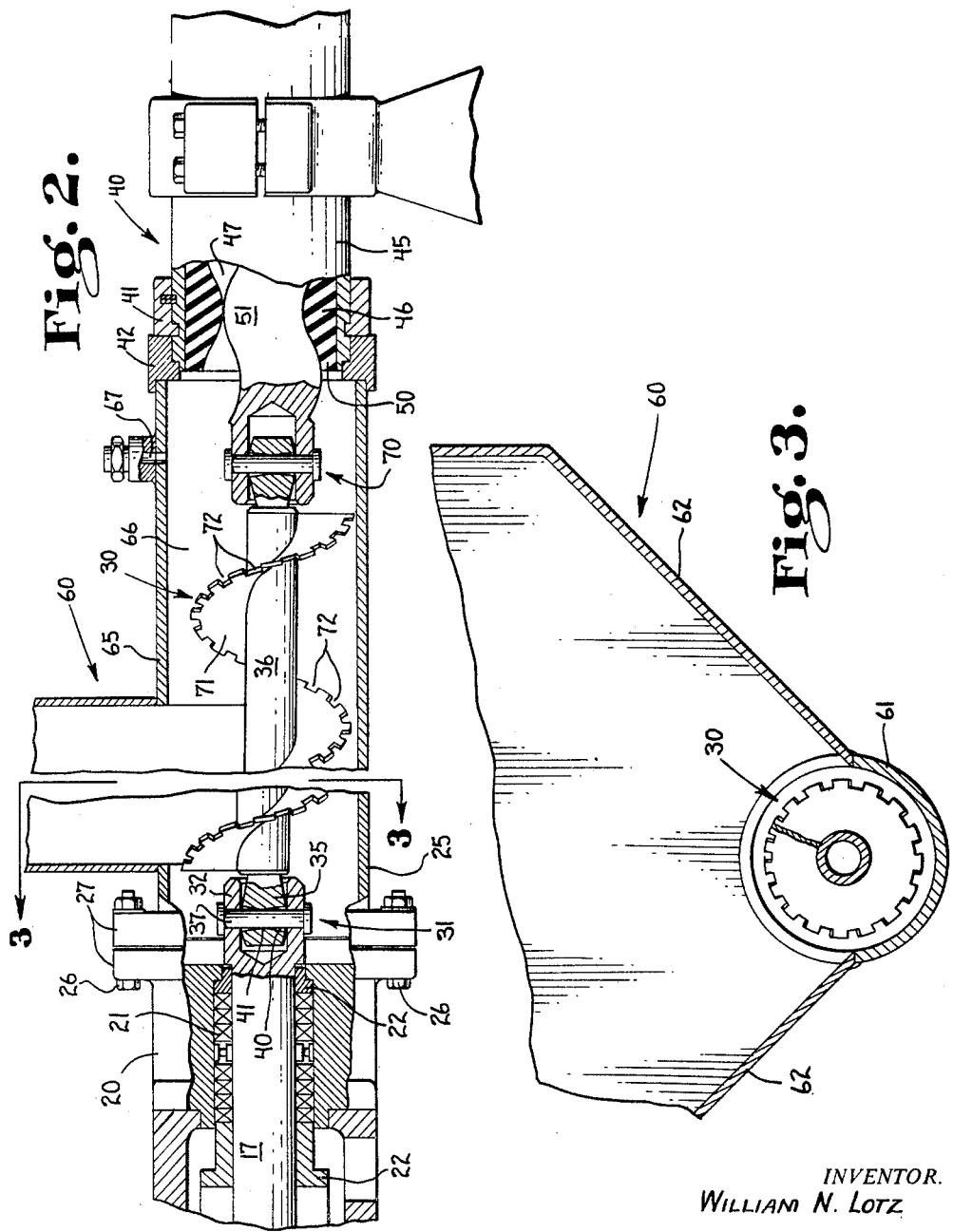
INVENTOR.
WILLIAM N. LOTZ
BY
Woodard, Weikart, Emhardt & Naughton
Attorneys United States Patent Office 3,502,041
Patented Mar. 24, 1970

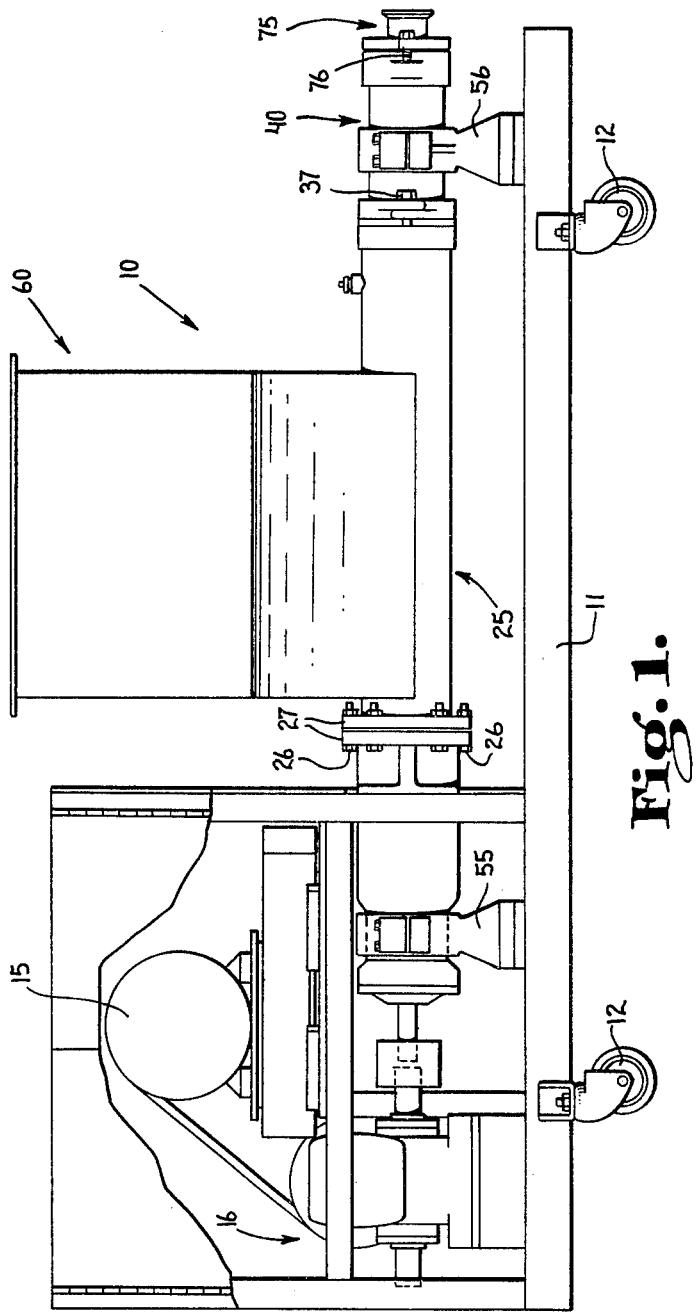

3,502,041
COMBINATION DOUGH DEGASSER AND TRANSFER MACHINE
William N. Lotz, Indianapolis, Ind., assignor to F. H. Langsenkamp Company, Indianapolis, Ind., a corporation of Indiana
Filed Mar. 22, 1968, Ser. No. 715,278
Int. Cl. A21c 9/00
U.S. Cl. 107—7                                    10 Claims

ABSTRACT OF THE DISCLOSURE

A dough pump including a positive-displacement progressing-cavity pump section fed by a screw with a flight having notches at intervals along its external periphery. The screw discharges into a degassing chamber located at the entrance to the pump section.

BACKGROUND OF THE INVENTION

Field of the invention

This invention relates to dough pumps usable for moving dough and the like from place to place.

Description of the prior art

It is present practice in the baking industry in certain applications to move dough from place to place prior to baking. For example, the dough might be moved from a mixer to a bun machine or from a mixer to a bread divider. Certain types of pumps have been used in the baking industry but have been found to break up the dough and to damage the gluten in the dough. Conceivably a positive-displacement progressing-cavity so called "Moyno" pump could be used in such an application without damaging the dough but it was previously believed to be impossible to get the dough started in such a pump.

Another problem present in the baking industry is the fact that just as soon as dough is mixed gas starts to form in the dough. This gas forming process continues at a fairly uniform rate so that dough which has been mixed for a period of time will have a substantially larger volume than dough the mixing of which has just been completed. This factor in the past has been a problem in that it has caused inconsistency in the weight of the final product such as buns or the like. Consequently, it is desirable that means be provided for moving dough from place to place and for simultaneously maintaining the dough in a uniformly degassed condition. It is also desirable that means be provided for mixing the dough as it moves from place to place to cut down on the time that the dough must spend in a conventional mixer.

SUMMARY OF THE INVENTION

One embodiment of this invention might involve, in pumping apparatus including a positive-displacement progressing-cavity pump section having a stator and a rotor, said stator having a helical hollow internal configuration leading from an entrance end to an exit end of said stator, said rotor having a helical external configuration and being adapted to rotate in said stator for moving material through said stator from said entrance end to said exit end, the improvement which comprises a conduit secured to said stator and leading into the entrance end thereof, a hopper arranged to discharge into said conduit, a screw rotatable in said conduit for moving material through said conduit from said hopper into the entrance end of said stator, said conduit having a port to atmosphere adjacent said stator entrance end for degassing the material within said conduit, said screw having a screy thread the external periphery of which is notched at intervals along the length of said screw.

One object of this invention is to provide an improved dough pump.

Another object of this invention is to provide a dough pump which efficiently moves dough from place to place without damaging the dough.

A further object of the invention is to provide a dough pump which also mixes and degasses the dough.

Related objects and advantages will become apparent as the description proceeds.

BRIEF DESCRIPTION OF THE DRAWINGS

The full nature of the invention will be understood from the accompanying drawings and the following description and claims.

FIG. 1 is a side elevation with certain portions removed to illustrate internal construction of a dough pump embodying the present invention.

FIG. 2 is an enlarged view similar to FIG. 1 with the major portion of FIG. 2 in a section taken axially of the structure of FIG. 1.

FIG. 3 is a vertical section taken along the line 3—3 of FIG. 2 in the direction of the arrows.

DESCRIPTION OF THE PREFERRED EMBODIMENT

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a dough pump 10 which includes a frame 11 mounted upon suitable casters 12 for moving the dough pump from place to place. Mounted upon the frame 11 is a motor 15 which drives a transmission 16 coupled to a drive shaft 17 for the dough pump. The drive shaft 17 is mounted within a housing 20 with packing 21 and bearings 22 being located between the housing 20 and the drive shaft 17. The housing 20 is secured to a further housing 25 by means of bolts 26 which extend through flanges 27 one flange 27 being on the housing 20 and one flange 27 being on the housing 25.

The housing 25 is at least in part a cylindrical conduit through which material such as dough and the like is conveyed by the screw 30. The screw 30 is coupled to the drive shaft 17 by means of a universal joint 31 which permits the screw 30 to oscillate back and forth during operation even though the drive shaft 17 does not oscillate and instead rotates about its axis. The universal joint 31 consists of a socket 32 in the end of the shaft 17 and a knob 35 on the end of the stem 36 of the screw 30 and further consists of a pin 37 which extends through a double tapered hole 40 having a central neck portion 41 at the center of the knob 35. It can be appreciated that the universal joint 31 permits a certain amount of freedom of movement in oscillation of the stem 36 of the screw 30 relative to the shaft 17.

Coupled to the housing 25 by means of screws 37 (one shown) is a "Moyno" pump section 40. The screws 37 extend through collars 41 and 42 which are secured respectively to the housing 45 of the pump section 40 and to the housing 25. The Moyno pump section 40 may be a conventional such pump section as manufactured by Robbins and Myers, Inc., Moyno Pump Division of Springfield, Ohio. The Moyno pump section 40 is constructed according to the disclosure of Patent 2,028,407 entitled Gear Mechanism and preferably includes an outer housing 45 within which is fixed a rubber stator 46 having a helical hollow internal configuration 47 leading from an entrance end 50 to the exit end (not shown) of the stator. Received within the stator 46 is a rotor 51 having a helical shape the number of threads of which are less by one unit than the corresponding number of threads in the stator 46. As the rotor 51 is rotated within the stator 46 a positive-displacement progressive-cavity action is provided for moving material from the entrance end 50 of the stator to the exit end thereof. This pumping action does not in any way damage the materials being pumped. For example, strawberries and the like can be pumped in such a pump without in any way cutting or harming the strawberries thus moved.

Referring again to FIG. 1 it is evident that the complete pump assembly including the housings 20, 25, and 45 are all mounted on the frame 11 by a means of support assemblies 55 and 56. A hopper 60 is secured to the housing 25 as best shown in FIG. 3. The housing 25 at one portion 61 thereof is approximately half cylindrical in configuration. The hopper 60 includes a pair of sloping side walls 62 which slope downwardly toward one another to intersect and join with the housing 25 at the portion 61. The side walls 62 intersect the housing 25 along lines which define a plane which approximately includes the axis of the screw 30.

It can be seen that the housing 25 also defines a cylindrical portion 65 to the right of the hopper 60 and between the hopper 60 and the pump section 40 said cylindrical portion 65 containing a degassing chamber 66. The screw 30 extends into the degassing chamber 66 and terminates therein. The degassing chamber is ported to atmosphere through the opening 67. The stem 36 of the screw 30 is secured to the rotor 51 by means of a universal joint 70 constructed generally identically to the universal joint 31. It can be appreciated that, even though the rotor 51 moves back and forth as it is rotated within the stator 46, the universal joint 70 permits driving of the rotor without binding.

The screw 30 is provided with a flight or a thread 71 which is notched at its external periphery by means of generally rectangular notches 72 spaced at equal intervals along the length of the flight 71. The screw thread or flight 71 is designed to move approximately twice as much material into the degassing chamber 66 as can be handled or moved by the pump section 40. Obviously a portion of the material moved into the degassing chamber 66 must return through the cylindrical conduit 65 toward the hopper thus producing a mixing action when the material is dough. Thus the function of the degassing chamber 66 is to remove the gas from the dough as well as to provide a location for thorough mixing of the dough prior to its moving into the pump section 40. The notched periphery of the flight 71 functions to open the dough so that the gas can be removed therefrom and can be forced out through the port 67 to atmosphere.

Thus the dough which is placed into the hopper 60 is moved by the screw 30 through the degassing chamber 66 where the dough is degassed. Then the dough moves into the pump section 40. In the usual application of the device the dough will then be pumped out of the pump section 40 into a conduit or line leading to a bun machine or to a bread divider or the like.

As illustrated in FIGURE 1, an exit nozzle 75 is secured to the housing 45 by means of screws 76. The nozzle 75 might be for example suitable for connecting the pump to a conduit having a three inch inside diameter whereas the "Moyno" pump 40 might have, for example, a five inch or a six inch inside diameter. In the case of the "Moyno" pump having a five inch inside diameter the pump will be run at somewhat greater speed than the pump having a six inch diameter. It should be understood, however, that the conduit through which the pump section 40 is coupled has preferably a reduced size as compared to the pump section 40 in order to maintain a head or pressure on the dough being pumped through the conduit.

It will be evident from the above description that the present invention provides an improved dough pump which efficiently moves dough from place to place without damaging the dough. It will also be evident that the dough pump of the present invention mixes and degasses the dough thus making possible reduction in mixing time.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

It should be mentioned that the machine of the present invention may have other applications such as, for example, the chopping or mangling of vegetables.

In the claims which follow it should be understood that even though reference is made to a stator and rotor and to a rotor moving inside of a stator that it is also understood that relative movement is all that is required. For example, the stator could possibly rotate with the rotor stationary.

The invention claimed is:

1. In pumping apparatus including a positive-displacement progressing-cavity pump section having a stator and a rotor, said stator having a helical hollow internal configuration leading from an entrance end to an exit end of said stator, said rotor having a helical external configuration and being adapted to rotate in said stator for moving material through said stator from said entrance end to said exit end, the improvement which comprises a conduit secured to said stator and leading into the entrance end thereof, a hopper arranged to discharge into said conduit, a screw rotatable in said conduit for moving material through said conduit from said hopper into the entrance end of said stator, said conduit having a port to atmosphere adjacent said stator entrance end for degassing the material within said conduit, said screw having a screw thread the external periphery of which is notched at intervals along the length of said screw.

2. The pumping apparatus of claim 1 additionally comprising power means connected to said screw for the rotation thereof, said screw being connected to said rotor for the driving thereof by said power means through said screw.

3. The pumping apparatus of claim 1 additionally comprising a power means adapted to rotate said screw, said power means being connected to said screw by a first universal joint, said screw being connected to said rotor for the driving thereof by a second universal joint.

4. The pumping apparatus of claim 3 wherein said conduit includes a degassing chamber into which said port opens, said screw extending into said degassing chamber, said degassing chamber being located between said stator entrance end and said location at which said hopper opens into said conduit.

5. The pumping apparatus of claim 4 wherein said screw is proportioned in relation to said stator and rotor to move approximately twice the amount of material that said stator will accept at said stator entrance end, whereby approximately half of the material that is moved by said screw moves back to said hopper via said conduit and approximately half of the material that is moved by said screw moves through said pump section thereby providing a mixing and degassing action in said degassing chamber.

6. The pumping apparatus of claim 5 wherein said hopper includes a pair of side walls which extend generally parallel to the axis of said screw, said conduit extending horizontally, said conduit having, generally a half cylindrical configuration at the location at which said hopper opens into said conduit, said screw being located approximately half way into said hopper and approximately half way into said conduit at said location, said side walls tapering downwardly toward one another and joining said conduit at said location along a pair of lines which define a plane which generally includes the axis of said screw.

7. The pumping apparatus of claim 6 wherein said notches are rectangular and are equally spaced along the length of said screw.

8. The pumping apparatus of claim 1 wherein said screw has a discharge end from which the material moves into said stator, said hopper being arranged to open into said conduit at a location spaced from the entrance end of said stator, said discharge end of said screw being positioned between the entrance end of said stator and said location.

9. The pumping apparatus of claim 1 wherein said hopper includes a pair of side walls which extend generally parallel to the axis of said screw, said conduit extending horizontally, said conduit having generally a half cylindrical configuration at the location at which said hopper opens into said conduit, said screw being located approximately half way into said hopper and approximately half way into said conduit at said location, said side walls tapering downwardly toward one another and joining said conduit at said location along a pair of lines which define a plane which generally includes the axis of said screw.

10. The pumping apparatus of claim 1 wherein said notches are rectangular and are equally spaced along the length of said screw.

References Cited

UNITED STATES PATENTS

| | | |
|---|---|---|
| 615,421 | 12/1898 | Beyer. |
| 3,211,209 | 10/1965 | Latinen et al. |
| 3,216,768 | 11/1965 | Soeding et al. |

FOREIGN PATENTS 78,080   9/1919   Germany.

WALTER A. SCHEEL, Primary Examiner

R. I. SMITH, Assistant Examiner

U.S. Cl. X.R.

18—12; 103—117; 107—15, 40